Oct. 9, 1934.  H. HOLLERITH, JR  1,976,021
TESTING DEVICE
Filed April 17, 1926   2 Sheets-Sheet 1

Inventor
Herman Hollerith, Jr.
By
Mauro, Cameron, Lewis and Kerkam.
Attorneys

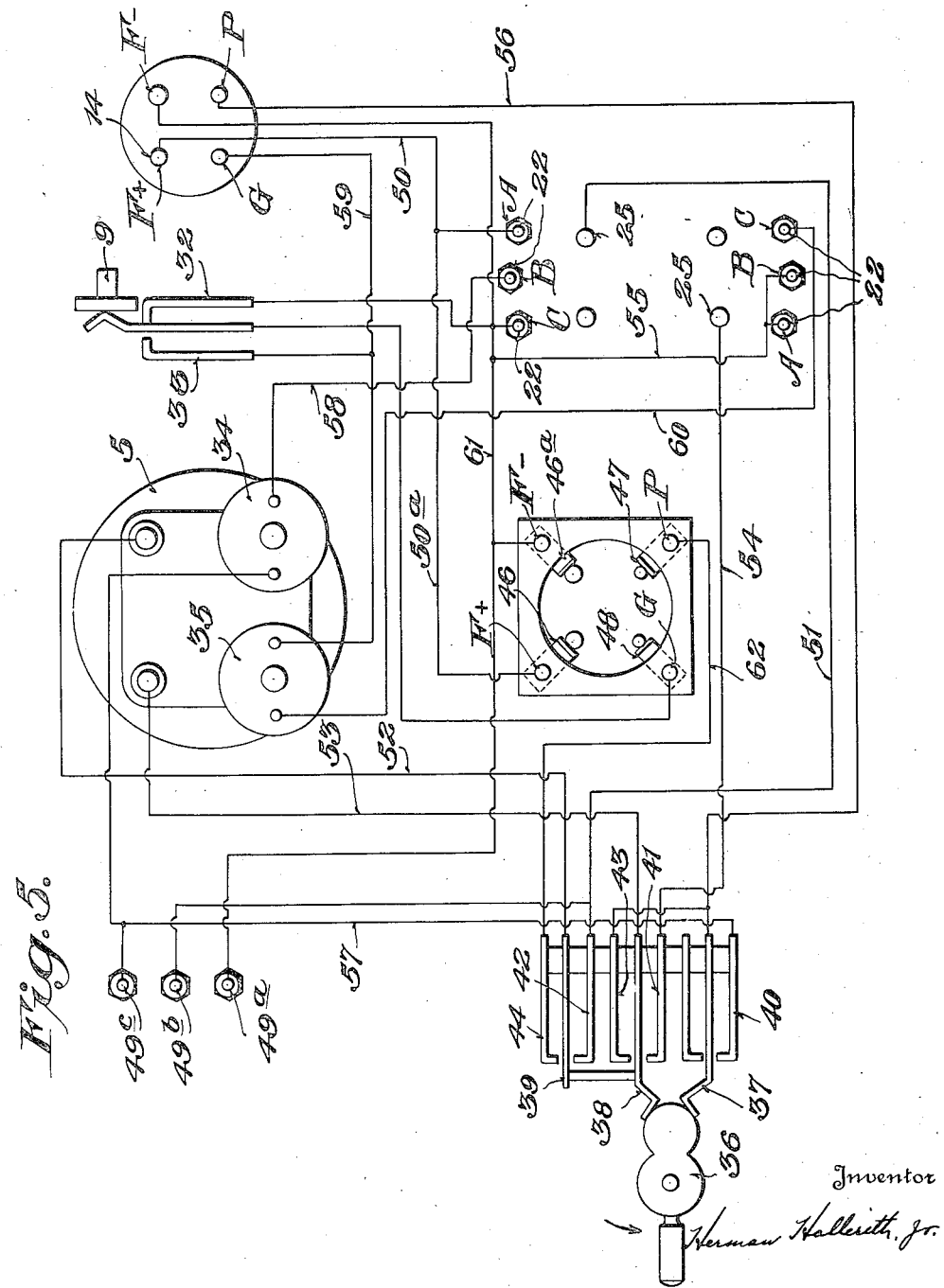

Patented Oct. 9, 1934

1,976,021

UNITED STATES PATENT OFFICE 1,976,021

TESTING DEVICE

Herman Hollerith, Jr., Riverton, N. J., assignor, by mesne assignments, to Radio Corporation of America, New York, N. Y., a corporation of Delaware Application April 17, 1926, Serial No. 102,772

4 Claims. (Cl. 250—20)

This invention relates to a testing device for electrical apparatus and more particularly to means for testing the various circuits and tubes employed in radio apparatus or analogous vacuum tube system of any type.

It has heretofore been proposed to provide means for testing three-electrode tubes wherein a plurality of switches and plugs are employed for associating the tube to be tested with a plurality of measuring devices, such as voltmeters and ammeters. Such apparatus has not proven entirely satisfactory due, among other reasons, to the complexity and cost of the same. It has also been proposed to provide a portable tester for vacuum tubes embodying a casing carrying a voltmeter, a milliammeter, a tube socket, and circuit connections to a plug which is adapted to fit into the socket in a radio receiving set, but apparatus of this character is not adapted to afford all of the information desired in testing vacuum tube apparatus.

One of the objects of the present invention is to provide a novel device for independently testing the various circuits and also independently testing the tubes of vacuum tube apparatus, the source of power of the radio apparatus being employed for the testing.

Another object is to provide testing means embodying a single measuring instrument for testing the voltages and current flow in the circuits of a vacuum tube system.

Another object is to provide a portable testing device which includes means for independently and selectively testing the A battery circuit, the B battery circuit and the C battery circuit.

A further object is to provide a portable testing device including means whereby the voltage measuring instrument may be employed as a milliammeter to enable the plate circuit of a tube to be tested.

A further object is to provide means for determining whether the electrode elements of the tube are damaged or contacting one with the other.

A still further object is to provide a portable testing device which shall include means for testing tubes and tube circuits in addition to means for directly testing batteries or other devices. These and other objects will appear more fully hereinafter.

Referring to the accompanying drawings illustrating one expression of the inventive idea, and wherein like reference characters refer to like parts throughout the several views, Fig. 1 is a top plan view of the apparatus constituting the subject matter of the present invention;

Fig. 5 is a diagrammatic view illustrating the various circuits which may be employed.

The testing device constituting the subject matter of the present invention is of the portable type adapted to be housed in a suitable box or cabinet 1 provided with a hinged lid 2. A panel 3 formed of a suitable dielectric such as hard rubber, is preferably mounted flush with the upper edge of the sides of the box and is maintained in position as by means of a plurality of screws 4, to provide a mounting for certain elements of the testing set.

Figure 1:
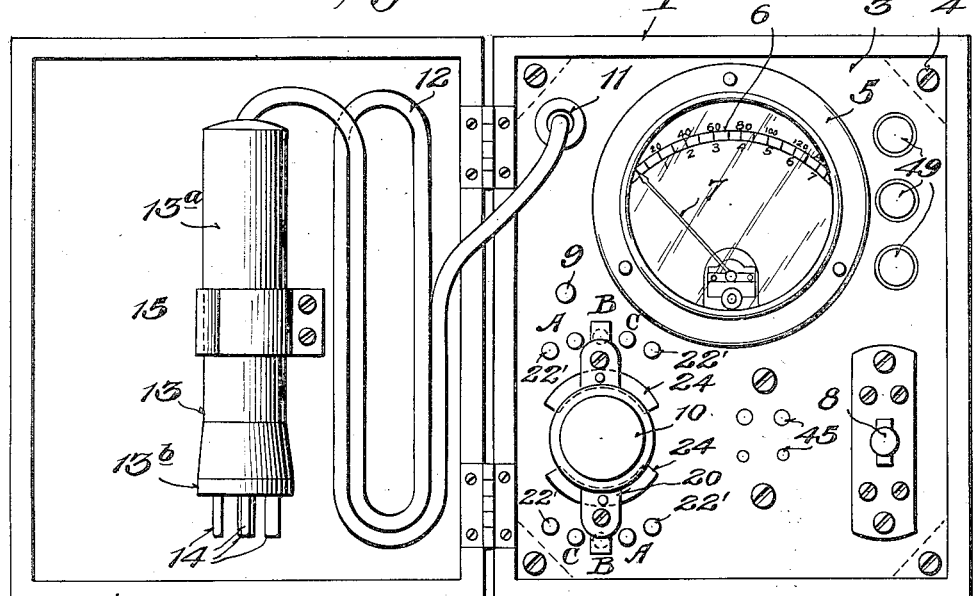
Figure 2:
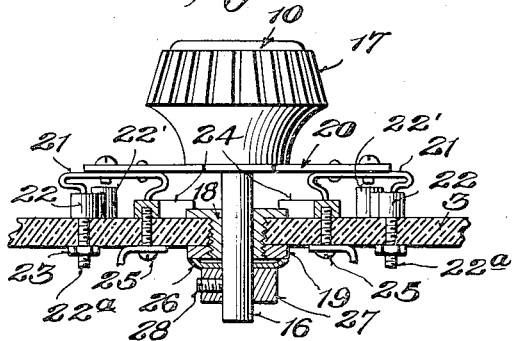
Fig. 2 is an enlarged detail side view, partly in section, illustrating one type of switch means which may be employed.
Figure 3:
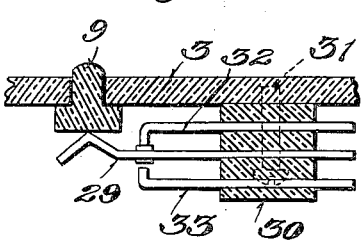
Fig. 3 is a detail sectional view illustrating another embodiment of switch mechanism which is preferably employed in accordance with the present invention.
Figure 4:
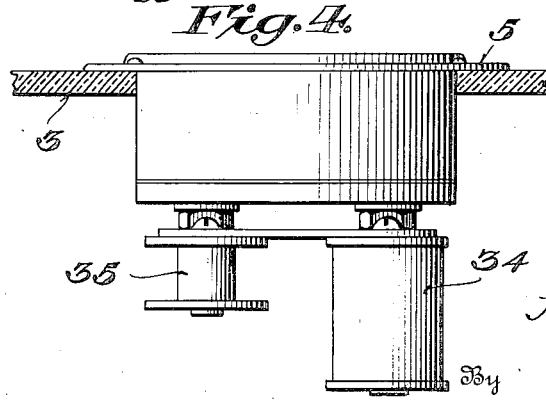
Fig. 4 is a detail side elevation, partly in section, of the voltammeter shown in plan in Fig. 1.

Various arrangements may be used in mounting the elements of the testing device on the panel 3 and it will therefore be understood that the detail description hereinafter regarding the relative positions of said elements is by way of example only. As shown, a voltmeter 5 which is used as a milliammeter also and which is provided with a double scale 6 and the usual needle 7, is mounted centrally of one end of the panel. Associated with voltmeter 5 by means of electrical circuits to be described more fully hereinafter, is a double-throw switch 8 suitably mounted on the panel, a push button switch (Fig. 3) provided with a push button 9, and a rotatable switch 10 (Fig. 2). Suitably connected to the voltmeter and extending through an opening 11 in the panel 3, is an electrical conduit 12, constituted by four insulated leads, which is provided on its outer end with a plug 13 having four contacts 14 similar in character and arrangement to the contacts on the tubes employed in the radio set which it is desired to test. The plug 13 is preferably constituted by a hollow cylinder 13a, which may be formed of wood, and a dielectric portion 13b for mounting the contacts 14. Preferably the lid or cover 2 of the casing is provided on its inner face with a spring clip 15 for holding the plug 13 against movement when the casing is closed and the set is being carried.

The switch 10 which is employed for controlling the A, B and C battery circuits may be of any suitable type but preferably it is adapted for adjustment to three or more different positions. As shown more clearly in Figure 2 this switch comprises a spindle 16 which carries a knurled knob 17 on the upper end thereof. The lower end of the spindle extends through a flanged bushing 18 threaded through the panel 3. A lock nut 19 is threaded on to the bushing 18 below the panel to maintain said bushing against movement in either direction. The switch mechanism proper includes a dielectric strip 20 which is secured to and rotatable with the spindle 16 at a convenient distance above the panel 3. Rigidly attached to the lower surface of the opposite ends of strip 20 are U-shaped spring contacts 21 which are adapted for engagement at their outer ends with a plurality of spaced contacts 22. These contacts are arranged on the arc of a circle and are preferably six in number, three contacts being provided for each of the spring contacts 21 on the opposite sides of spindle 16. The contacts 22 are maintained in position on the panel 3 by threaded portions 22a that extend downwardly through the panel and are provided with retaining nuts 23 which are threaded along the portions 22a into engagement with the lower side of the panel 3. A plurality of stops 22', which extend above the upper surface of panel 3 for a greater distance than contacts 22, are suitably positioned adjacent the latter for engagement with the edges of spring contacts 21, whereby the rotary movement of spindle 16 is limited. The inner ends of the spring contacts 21 have sliding engagement with the arcuate contact strips 24, one of the latter being arranged adjacent each of the series of contacts 22 and suitably insulated therefrom. Strips 24 are maintained in position on panel 3 by means of screws 25 which extend through the panel and have threaded engagement with said strips. The screws 25 constitute binding posts for lead wires employed in certain of the circuits, to be described more fully hereinafter. Spindle 16 is held against vertical movement by means of a suitable resilient member 26 which has engagement with the lower face of nut 19, the member 26 being held in place on spindle 16 by a retaining member 27 provided with a suitable lock screw 28. In the form shown, the push button switch includes a button 9 which slidably extends through an opening in the panel 3 and is maintained in position by spring contact member 29 that is carried by a dielectric block 30 suitably attached to the lower surface of the panel 3 as by means of screws 31. Contact member 29 normally has engagement with a contact 32 carried by the block 30. When the push button is forced downwardly the circuit through members 29 and 32 is broken and member 29 is adapted to close a circuit through a contact 33 which is also carried by the block 30 for a purpose to be described hereafter.

Secured to the lower face of the voltmeter casing are two resistance coils 34, 35 for use in reading "B" battery and "C" battery voltages as will be described more fully hereinafter.

The double-throw switch 8 includes a pivotally mounted handle 36 (Fig. 5), the upper end of which extends above the surface of the panel and the lower end of which extends below the lower face of the panel into engagement with a pair of spring contact members 37, 38. An additional spring contact 39 is provided adjacent the member 37 and all of said contacts 37, 38, 39 are adapted to move in unison in either direction, depending on the direction in which the handle 36 is thrown. When handle 36 is moved in the direction of the arrow in Fig. 5 the spring contacts 37, 38, 39 are adapted to engage contacts 40, 41, 42 respectively. When handle 36 is thrown in the opposite direction spring contacts 38 and 39 are adapted to engage suitable contacts 43, 44 respectively.

In order that tubes may be tested as well as the battery circuits leading up to the tube sockets in the receiver, the panel is provided intermediate the switches 8 and 10 with four openings 45 for receiving the contact posts of a tube, and permitting said contacts to pass through the panel into engagement with terminals 46, 46a, 47, 48. Binding posts 49 are provided on the panel adjacent the voltammeter 5 in order to facilitate the direct testing of batteries or other devices.

*Operation.*—If it is desired to test the various circuits of a radio receiver or other vacuum tube system leading to any particular socket, the tube for that socket is removed and the portable plug 13 is inserted in the socket, the tube being generally inserted in the socket 45 of the testing device. Switch 10 is then moved to "A" position with the spring contact members 21 in engagement with the contacts 22A. Switch handle 36 is then turned in a direction opposite to the direction of the arrow to move spring contact members 37, 38, 39 into engagement with contacts 40, 41, 42 respectively. Current now flows from the A battery to the socket contact, through the F+ terminal 14 in the plug 13, through a conductor 50 to contact 22A, through the spring contact member 21 to contact strip 24, terminal 25, through a lead 51, contact 42, spring contact 39, a lead 52, voltmeter 5, a lead 53, contact 38, contact 41, a lead 54, terminal 25, strip 24, spring contact 21, terminal 22A and a lead 55 to terminal F— in the plug 13. The voltage of the "A" battery is thus tested and determined, and simultaneously a test is made of the A battery circuit up to and through the socket into which plug 13 has been inserted. The voltage reading is taken from the lower series of numerals provided for scale 6 of the measuring device 5.

To test the B battery voltage, and the circuits therefor, switch 10 is now moved to B position and switch 8 is maintained in the same position it occupied in testing the A battery. Current now flows from the B battery to the socket contact through the P terminal 14 of plug 13, past switch 8, through resistance coil 34, through the B22 contacts of switch 10, through the voltmeter and through the F— contact 14 of the plug 13. The use of resistance coil 34 enables the voltage reading to be taken from the upper series of numerals provided for scale 6 of the measuring device 5.

To test the C battery voltage, and circuits therefor, the switch 10 is moved to C position and switch 8 is maintained in the position last described. Current flows through the various circuits including the voltmeter and resistance coil 35, which coil is of lower resistance than the coil 34. The reading is taken from the lower series of numerals on scale 6. A single voltmeter is thus employed for determining the voltages of the three battery circuits and for testing the circuits for said batteries. The batteries may be directly tested by connecting the same to the binding post 49. Post 49a receives the negative lead of the battery, post 49b receives the positive side of any battery having a voltage of not more than 7.5 volts, for example, and post 49c receives the positive leads of the batteries having voltages greater than 7.5 volts.

If it is now desired to test the plate current of the tube, the tube being inserted in the socket 45 provided on the panel 3, switch 8 is thrown in the direction of the arrow in Fig. 5. Current will now flow through the filament-plate circuit of the tube, through contacts 44, 39, through the voltmeter 5, which now becomes a milliammeter, through contacts 38, 43 and lead 56. The milliamperes of the plate current are read from the lower numerals of the scale on the measuring device 5.

Frequently the filament of the tube may be damaged, and in engagement with the grid. To determine this fact it is only necessary to place the tube in the panel socket and move switch 36 to a position to secure a reading of the milliamperage. Now actuate the push button 9 whereupon the grid of the tube is disconnected from the negative terminal of the socket in the radio receiver and a bias is placed on the grid. If the tube is in an undamaged condition and is operating properly, the plate current in the tube, as indicated by the milliammeter, will decrease.

There is thus provided a test device which is extremely compact and which embodies a single measuring device for measuring the voltages of the A, B and C batteries, for testing the respective circuits of these batteries, for determining the plate current and voltage of the tube, for determining the condition of the electrodes of the tube and for directly testing the batteries or other circuits. The batteries of the receiving set are employed as the source of power for the test. By comparing the readings secured from a direct test of the batteries with the readings secured from a test of the voltages flowing through the circuits to the tube socket, the condition of said circuits may be determined. The use of a single measuring device constituting both a voltmeter and a milliammeter greatly decreases the cost of the apparatus and simplifies its construction.

While the sources of A, B and C voltages have been described as batteries, it will be obvious that the testing device will operate as well when any other sources of voltage are employed, such as the usual A. C. rectifiers, power packs, etc.

When the tube under test is positioned in the socket of the panel the resistances 34 and 35 may be cut out by throwing the double-throw switch 8 in one direction and the tube itself is placed in circuit with the measuring device. The readings of the measuring device under these conditions are in milliamperes. By throwing the double-throw switch 8 in the opposite direction the tube is disconnected from the circuits, and by actuating the rotatable switch 10 the voltages in the grid, plate and filament circuits of the radio set may be secured. There is thus secured a very convenient and compact portable testing device.

Only one embodiment of the invention has been described in detail and illustrated in the accompanying drawings. It is to be expressly understood, however, that the drawings are for purposes of illustration only and are not designed as a definition of the limits of the invention. Various arrangements may be employed for mounting the elements of the device on the panel. The switches may be combined or separate, separate switches being employed for the various circuits if desired. Reference will therefore be had to the appended claims for a definition of the limits of the invention.

What is claimed is:

1. A portable tester for a radio receiving set comprising in combination, a panel, an electrical measuring device thereon, socket means having terminals adapted to receive the terminals of at least one of the tubes of said set, means providing circuit connections for associating the device and socket terminals with the grid, cathode and anode circuits of said set, switching means in circuit with said device for selectively connecting it with the circuit connections of said last named means to provide an indication of an electrical condition of said grid, cathode and anode circuits of said set, switching means for connecting said device with a terminal of said socket means, and switching means for selectively connecting the grid terminal with one of the cathode terminals of said socket means and with the grid circuit connection of the second named means, thereby to determine by an indication of said device a condition of operation of a tube when connected with said socket means.

2. A testing device for radio apparatus including in combination, means adapted to be connected with said apparatus to provide circuit connections therefrom for the electrodes of an electrical discharge device, an electrical measuring instrument responsive to current flow through it, switching means interposed between said first named means and said instrument for causing current to flow selectively from each of the circuits provided by said connections through said instrument as an indication of an electrical condition of each of said circuits, socket means for the terminals of an electric discharge device, switching means for connecting said instrument in circuit with one of said terminals, and switching means for connecting another of said terminals with one of said circuit connections, whereby a change of current flow through said instrument is provided as an indication of an operating condition of an electric discharge device when connected therewith.

3. A combined tube and apparatus testing apparatus including in combination, an electrical measuring device, a vacuum tube socket, means providing grid, cathode and anode extension circuit connections, switching means for selectively connecting said measuring device with each of said extension circuit connections, certain of said extension circuit connections being provided with terminals in said vacuum tube socket, switching means for selectively connecting a grid terminal of said vacuum tube socket with a cathode terminal thereof and with a grid lead in said extension circuit, and switching means for connecting said electrical measuring device in circuit with the anode terminal of said vacuum tube socket.

4. A testing apparatus for vacuum tube circuits and vacuum tube devices, including in combination, an electrical meter, means providing grid, filament and anode circuit extension leads from said apparatus, means in said apparatus for connecting a vacuum tube to each of said circuit extension leads, switching means for selectively connecting said electrical meter with each of said circuit extension leads independently of a connection with a vacuum tube, means for applying potentials to said electrical meter independently of said circuit extension lead connections, certain of said switching means being arranged to adapt said electrical meter to read anode current to said tube, and switching means for selectively applying a biasing potential to said tube from the cathode and from one of said circuit extension leads.

HERMAN HOLLERITH, Jr.